June 1, 1937. E. ROBERTS 2,082,513
FILTER SIEVE AND ART OF MAKING THE SAME
Filed July 26, 1934

Inventor
Eugene Roberts
by Geo. N. Goddard,
Attorney

Patented June 1, 1937

2,082,513

UNITED STATES PATENT OFFICE 2,082,513

FILTER SIEVE AND ART OF MAKING THE SAME

Eugene Roberts, Hastings, N. Y., assignor to The Western States Machine Company, Salt Lake City, Utah, a corporation of Utah Application July 26, 1934, Serial No. 737,052

3 Claims. (Cl. 210—76)

This invention relates to sieves for industrial purposes where usually sieves of large area are needed, such as in the separation of liquid from intermingled solid particles, for example, in sugar or other centrifugals, and in filter presses as well as the separation or sifting out of fine particles from coarser ones.

A very fine sieve is likely to be too limp and delicate to be practically available for many industrial purposes without involving a very heavy expense for frequent repairs and replacements, and consequently the tendency has been to use a much coarser screen than would be desirable in many cases.

In my co-pending application for Letters Patent of the United States Serial No. 708,842, filed January 29, 1934, which matured into United States Letters Patent No. 2,061,850 on November 24, 1936, I have disclosed a composite screen comprising fine foraminous filter sheets or sieves, either of thin finely perforated sheet metal or of fine wire gauze, integrally united with a relatively stiff coarsely perforated backing sheet throughout their areas of contact by an intervening film of low-fusing metal, such as tin or solder. The present invention constitutes a modification of said earlier composite filter screen and comprises a fine foraminous sieve sheet of wire gauze, which is integrally united with a relatively coarse and stiff wire mesh backing by an intervening uniting film of low-fusing metal applied after the wire mesh has been flattened to a substantially uniform thickness throughout.

Since at the intersecting or crossing points the wire mesh is of double thickness, while the intermediate or single wire portions of the mesh have only the thickness of a single wire, the areas where the superposed sieve sheet would contact with the high spots of the coarse mesh backing would be so small that it would be difficult, if not impracticable, to unite the two sheets integrally in a thoroughly reliable and satisfactory way, but if the high spots or humps at the intersecting points of the wire mesh be levelled under sufficient pressure, such high spots on each side of the backing mesh will be spread out horizontally forming a relatively wide flat area substantially flush with the intermediate single wire portions and the fine sieve will lie in smooth contact with such areas to which it is securely anchored by the fused soldering film penetrating the openings or interstices of the fine sieve member subtending such flat areas of the mesh, so that there is produced an integral self-supporting screen of any desired fineness capable of withstanding the pressure and the friction or rubbing to which it may be subjected for industrial service.

In the accompanying drawing I have illustrated the construction of such a filter sieve and the method by which it is produced, in which Fig. 1 is an edge view of the relatively coarse wire mesh backing sheet woven in the usual way.

Figure 6:
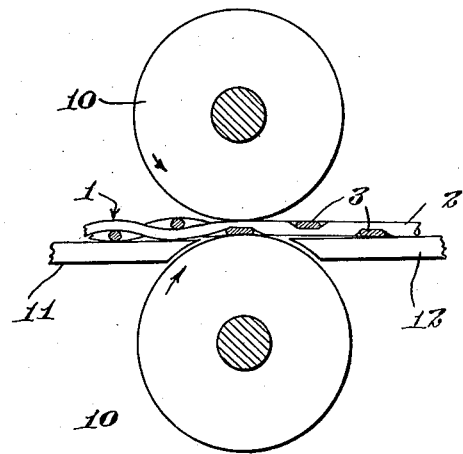
Fig. 6 illustrates the flattening of the wire mesh backing by passing it through compressing rolls.

In the practice of this invention, for the production of a screen or lining for use in a sugar centrifugal a suitably dimensioned strip 1 of woven wire mesh, comprising in this case warp wires 2 and weft or transverse wires 3, is passed through one or more pairs of pressure rolls 10, being fed thereto over a supporting table 11 whose rear portion 12 receives the straightened and flattened mesh, as shown in Fig. 6.

The backing mesh 1, when subjected to this flattening operation, is then dipped or coated with molten tin or soldering material and after the film or coating has cooled is then assembled in face to face relationship with the selected fine wire gauze 4, which may be passed through pressure rolls for the purpose of straightening the sheet in order to remove the curl of the sheet and permit it to lie flat in face to face contact with the flattened areas of the backing mesh 1.

For a centrifugal filter I preferably use a No. 8 coarse mesh backing, that is, having approximately 8 meshes to the inch, but obviously this is capable of wide variation according to particular needs. When the strips of wire mesh and of wire gauze are imposed, one against the other, they are passed through an oven provided with pressure rolls, the oven being kept at a temperature of approximately 450° F., or at whatever temperature is required to cause the proper fusing of the particular soldering material employed and is cooled after issuing from the oven, so that the two layers or sheets comprising the screen are integrally united throughout their areas of contact.

Figure 1:
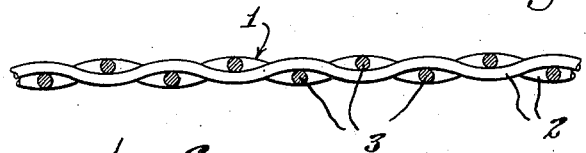
Figure 2:
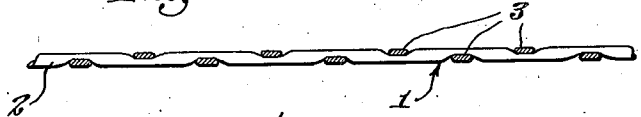
Fig. 2 is a similar view of the same wire mesh when compressed or flattened to substantially uniform thickness.
Figure 3:
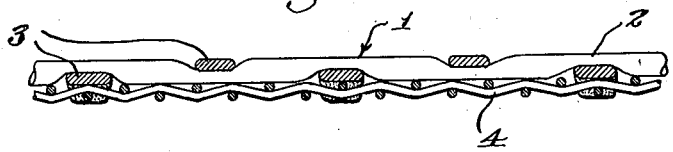
Fig. 3 is an edge-wise view showing on a much enlarged scale the backing sheet with a fine wire gauze sieve sheet applied to the face thereof and anchored thereto by the fusible film or coating that has been previously applied to the wire mesh and which, when fused, penetrates the subjacent interstices of the wire gauze.
Figure 5:
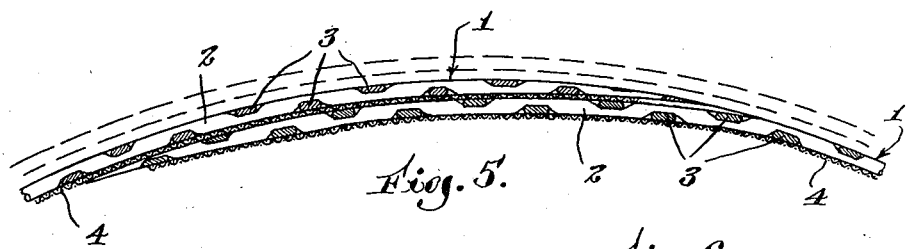
Fig. 5 is a plan view showing the end portions of the composite screen overlapping as they appear when inserted in a centrifugal basket.
Figure 4:
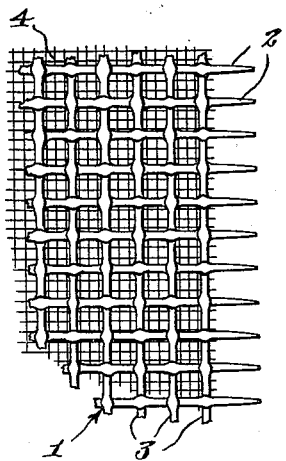
Fig. 4 is a back view of the composite sieve showing the flattened wire mesh backing and the integrally united wire gauze sieve member.

Where, as in the case of a centrifugal basket filter, it is necessary to overlap the ends of the screen, I prefer to remove the marginal end edge portion of the wire gauze and grind down or compress the marginal end portions of the wire mesh backing to a gradual taper in order to avoid forming any abrupt ridge or hump at the overlapping edges of the two ends, as illustrated in Fig. 4 and particularly in Fig. 5, it being understood that such a filter screen or basket lining would rest against a surrounding grid or backing of any appropriate design to space it slightly from the wall of the basket to provide satisfactory drainage to the outlet holes in the basket wall.

For carrying out the step of compressing together and uniting the two layers of the screen, the apparatus shown in my aforesaid pending application may be advantageously used.

It will be understood that the flattening of the wire mesh backing is a very important step in the making of this composite sieve, since otherwise there would be only bare points of contact between the high spots of the protuberances or wave-like ridges of the woven wire mesh, while a very fine wire mesh would tend to follow the convolutions present in such a woven wire mesh and the result would be insecure attachment, as well as an uneven or rough surface presented by the wire gauze.

What I claim is:

1. A composite filter sheet or screen comprising a relatively coarse and stiff wire mesh backing having the intersections of its interwoven wires flattened to substantially the thickness of the non-intersecting portions of the wires, and a fine foraminous sieve sheet laid in face to face contact with the flattened areas of the mesh and integrally united therewith throughout their interforaminal contacting areas by an intervening film of low-fusing metal which penetrates the subtending interstices of the sieve to form a retaining matrix therefor.

2. A composite sieve comprising a wire mesh backing of substantially uniform thickness throughout presenting flat faces at the intersections of its component wires, said flattened mesh being provided with a coating film of low-fusing metal, and a fine wire gauze sheet laid in face to face contact with said flattened mesh and integrally united therewith throughout the areas of mutual contact by the fusible metal penetrating the interstices of the contacting portions of the gauze.

3. The improvement in the art of making fine filter sheets, which comprises flattening a relatively stiff and coarse wire mesh backing sheet to substantially uniform thickness throughout, coating the flattened mesh with a low-fusing metal, then uniting thereto in face to face relation a fine wire gauze sheet by pressing the sheets together in the presence of a temperature sufficient to fuse the fusible metal film and cause it to penetrate subtending interstices of the gauze.

EUGENE ROBERTS.